US008858135B2

(12) United States Patent
Heaton

(10) Patent No.: US 8,858,135 B2
(45) Date of Patent: Oct. 14, 2014

(54) SINK DRAIN FITTING CUTTER GUIDE

(76) Inventor: Kenneth Heaton, Orange, CA (US)

( * ) Notice: Subject to any disclaimer, the term of this patent is extended or adjusted under 35 U.S.C. 154(b) by 701 days.

(21) Appl. No.: 12/925,965

(22) Filed: Nov. 3, 2010

(65) Prior Publication Data

US 2012/0103162 A1 May 3, 2012

(51) Int. Cl.
*B23C 1/20* (2006.01)
*B26D 3/16* (2006.01)

(52) U.S. Cl.
CPC .................................... *B26D 3/163* (2013.01)
USPC ................... 409/179; 82/82; 82/113; 82/128; 30/103

(58) Field of Classification Search
USPC ......... 82/82, 100, 113, 128, 1.2; 30/102, 103, 30/105; 409/178, 179, 200
See application file for complete search history.

(56) References Cited

U.S. PATENT DOCUMENTS 5,815,926 A * 10/1998 Ekern ............................ 30/103
6,508,975 B1 * 1/2003 Godlewski et al. ............ 266/55

FOREIGN PATENT DOCUMENTS

JP 2002210611 A * 7/2002 ............ B23D 21/14

* cited by examiner

*Primary Examiner* — Andrea Wellington
*Assistant Examiner* — Nicole N Ramos
(74) *Attorney, Agent, or Firm* — Michael Bak-Boychuk

(57) ABSTRACT

An interlocked assembly of a circular collar receivable in suspension within a sink drain fitting and an annular support slidably engaged to the collar cooperate to form a guide aligning the blade of a rotary cutting tool adjacent the seat of a retaining ring that holds the fitting in place. The sliding translation of the annular support within the collar is limited by a radially projecting ring to limit the penetration depth of the rotary saw blade mounted in the guided tool thus limiting the incidence of damage to the surrounding sink structure.

7 Claims, 3 Drawing Sheets

SINK DRAIN FITTING CUTTER GUIDE

BACKGROUND OF THE INVENTION

1. Field of the Invention

The present invention relates to cutting guides, and more particularly to an annular mount for a rotary cutting tool which deploys and aligns its circular blade within the interior of a drain fitting of a sink to effect a cut at a depth substantially coinciding with the retaining ring groove in the fitting.

2. Description of the Prior Art

Those engaged in installing and/or replacing garbage disposals suspended from the underside of a sink drain fitting mounted in a kitchen sink are well aware of the difficulties associated with this task which are often compounded by the corrosion that invariably infests the very narrow spaces within which the suspending engagement is made. Simply, the corrosive environment of this very basic connection combined with the leakage limiting function thereof have resulted in a very minimal structure of the drain fitting itself that is usually replaced as a part of the repair or replacement process. Little effort is therefore devoted to save the old drain fitting as it is simply replaced as a part of a properly done repair.

In the current practice the drain fitting is fixed within the sink drain seat by an annular flange captured below the sink by a split ring seated in a ring groove formed in the neck of the drain fitting. Once so captured, a set of screws extending through the flange are advanced against the sink bottom to pull the drain fitting into an intimate sealing engagement against the seat, with the same flange then also providing the attachment structure for suspending the garbage disposal therefrom.

Of course, any removal process would ordinarily follow a reverse sequence of steps which, of necessity, entails the loosening of the tightened screws within the narrow confines beneath the sink, a manipulation that is often many years after the sink drain was first installed and now rendered substantially more difficult by long periods of corrosion. Even if somehow properly done this cumbersome removal process will invariably disrupt the original sealing contact between the drain fitting and the sink which may exhibit itself right after the job is done, or more often at some later time that may be much less convenient. Consequently good workmanship and also the natural corrosion processes compel the replacement of the simple drain fitting structure as a part of the repair, a replacement rendered most convenient by a powered cutting tool assisting in the extraction of the old fitting that may be fixed by years of corrosion in its mounted place.

In the past various cutting mechanisms and fixtures have been devised which in one way or another cut a pipe or tubing from the interior. Examples of such cutting devices may be found in the teachings of U.S. Pat. No. 4,369,573 to Vitale; U.S. Pat. No. 4,466,185 to Moutiero; U.S. Pat. No. 4,932,125 to Poveromo; U.S. Pat. No. 5,815,926 to Ekern; U.S. Pat. No. 6,508,975 to Godlewski et al.; U.S. Pat. No. 7,574,807 to Fuller et al.; and many others. Each of the foregoing, while suitable for the purposes intended, teaches a cutting tool that is deployable inside a tube to cut through the wall thereof at the point of its axial deployment and therefore little attention has been devoted to control both the radial and axial excursion of the cutting blade.

In contrast the cut that allows removal of a drain fitting mounted in a sink needs To avoid direct blade contact with the sealing surfaces of the sink and therefore must be axially aligned right over the exterior ring groove in order to release the captured flange retaining the drain fitting in the sink. Any axial departure from this deployment will either leave the ring in its capturing engagement against the flange, resulting in a useless cutting process, or in its upper ranges will expose the sink opening edges to potential cutting damage. Of course, since the replacement of garbage disposals is relatively infrequent, these attributes need to be simply and reliably implemented in an inexpensive mechanism and it is one such alignment mechanism that is disclosed herein.

SUMMARY OF THE INVENTION

Accordingly, it is the general purpose and object of the present invention to provide a nested assembly of annular rings in which the exterior ring is useful to align the assembly in a sink drain fitting while the interior ring supports and aligns the cutting tool.

Further objects of the invention is to provide a peripheral lip to support the interior ring of a nested ring assembly on the exterior ring to limit the axial translation of a rotary cutting tool received in the inner ring.

Yet other and additional objects shall become apparent upon the inspection and review of the description that follows in conjunction with illustrations associated therewith.

Briefly these and other objects are accomplished within the present invention by providing an exterior tubular segment or collar generally conformed for mating receipt within the central annulus of a sink drain fitting and suspended in this deployment by a plurality of radial projections extending from the upper exterior periphery thereof. An interior, generally thin walled, tubular segment provided with an upper peripheral band of a radial dimension greater than the central opening in the exterior collar is thus supported thereon upon its insertion therein with the radial space between these nested pieces then determining the relative radial excursions of the interior one. At the other end of the interior segment a lower, radially smaller, peripheral band is provided axially spaced from the upper band by a gap equal to, or just greater than, the axial height of the exterior collar, thereby capturing it therebetween.

This interlocked arrangement is then useful to support and guide a rotary tool fitted axially into the annulus of the interior segment to deploy a rotary blade mounted on the end of a shaft secured in its output chuck at an axial spacing just beyond the lower band, thereby fixing both the axial depth and the lateral range of movement of the blade to align the cut at the ring groove by the interlocking dimensional relationship between the exterior and interior segments. Thus the radial excursion of the axially fixed rotary cutting blade is effectively limited by the radial the above nesting arrangement and the thickness of the lower band, thereby limiting any potential of unwanted damage to the sink as its drain fitting is cut. This geometry also defines a substantially narrower intermediate dimension in the interior segment through which a lateral access opening can be formed for extending any tools that may be needed to tighten or loosen the chuck.

Those skilled in the art will appreciate that the foregoing arrangement can be implemented from various inexpensive polymeric structures and thus can be easily adapted to various rotary tools that may be found in a household, thereby accommodating an inexpensive item of specialized tooling that accompanies any replacement disposal. Similarly, the low cost aspects of this tooling can also extend the application thereof to replacement of drain fittings and the like, in each instance positive depth of cut and cut location being positively and simply determined by the dimensions of the nested structure and the radial dimensions of the cutting tool.

DESCRIPTION OF THE PREFERRED EMBODIMENT

Figure 1:
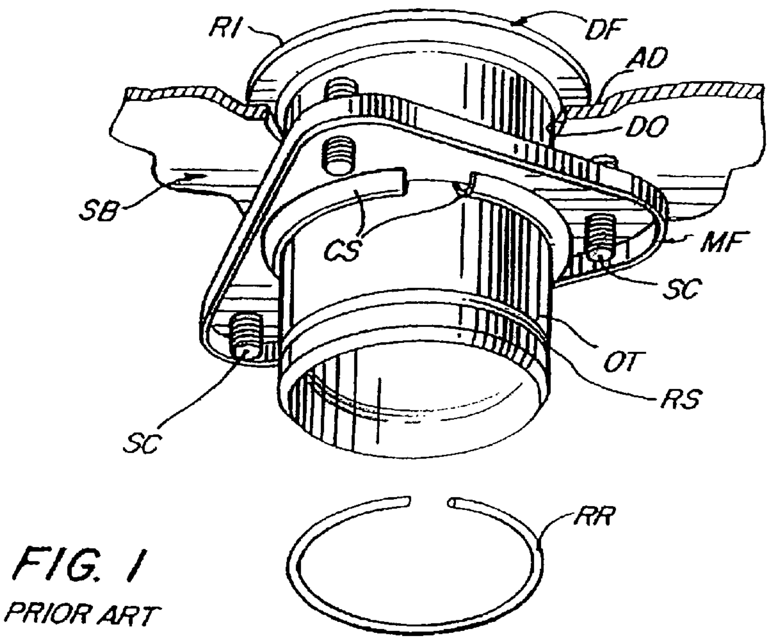
FIG. 1 PRIOR ART
FIG. 1 is a perspective illustration, in partial section, of a typical sink drain fitting seated in a sink drain to support a disposal therefrom.

In the teachings of U.S. Pat. Nos. 7,024,743 and 7,140,086 earlier issued to me, and also in the discussions, examples and the teachings set out in my published US patent application US 2009/0199382, all of which I now incorporate by reference as if fully described herein, wherein the general features of a typical sink drain fitting illustrated in FIG. 1 that by its engagement structure is clamped in the sink drain opening and to which heavy items like garbage disposals are sometimes attached. To obtain this attachment the upper flange of the drain fitting DF is bedded in an annular depression AD that surrounds the drain opening DO to extend its outlet tube OT into the space below the sink basin SB.

The foregoing deployment is then clamped to the sink basin SB by an annular mounting flange MF that is brought up from below onto the outlet tube OT and then engaged thereto by a retainer ring RR received in an exterior ring seat or groove RS. Once thus loosely engaged on the exterior of tube OT a set of set screws SC threaded through the flange MF are advanced against the bottom surface of the sink basin SB, clamping the drain fitting to the sink to provide a secure and structurally robust structure from which the disposal can be hung.

Of course, over time this damp and highly loaded structural arrangement will invariably accumulate extensive corrosion and the removal process of this tightly packed and heavily loaded mounting is therefore rarely convenient. Moreover, the same corrosive processes also degrade and harden most of the seals and their sealing interfaces which then dictates a full replacement of the whole fitting assembly as a part of a properly carried out garbage disposal replacement task, a replacement process that is greatly simplified by simply cutting away the whole of the clamping structure, which therefore demands that the cut be located right at the ring seat RS to assure direct disengagement of the retainer ring RR. Once thus disengaged all the corroded, deteriorated and worn parts of the sink drain fitting are simply replaced by new ones to provide the extended sealing efficacy and structural integrity matching the newly replaced disposal.

Figure 3:
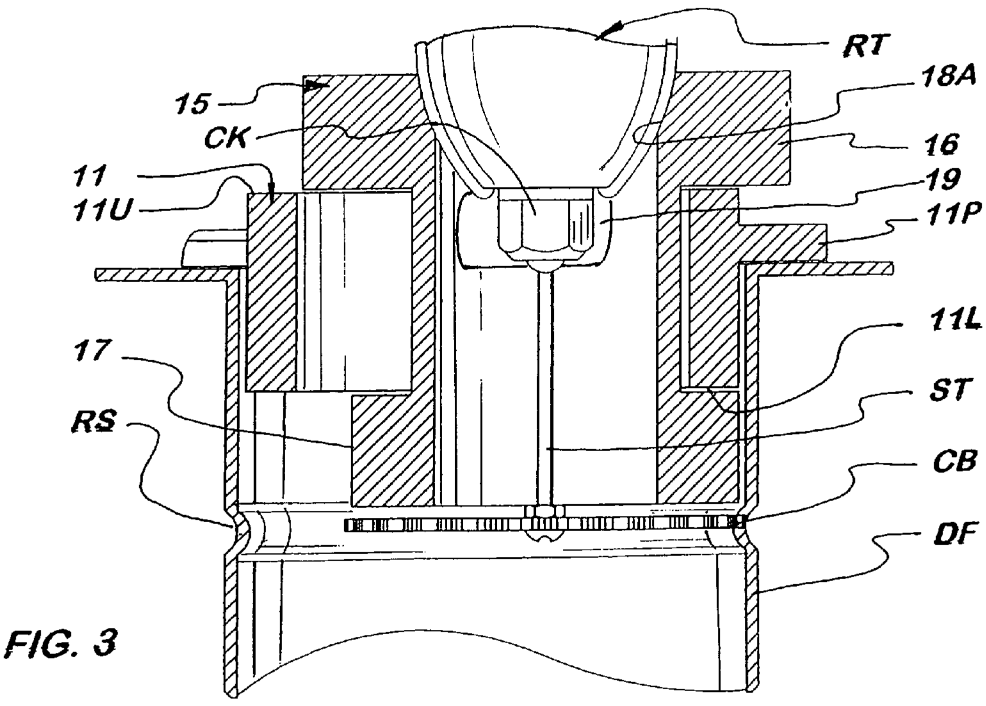
FIG. 3 is a side view, in section, illustrating the inventive cutter guide inserted in its operative position within a sink drain fitting.
Figure 2:
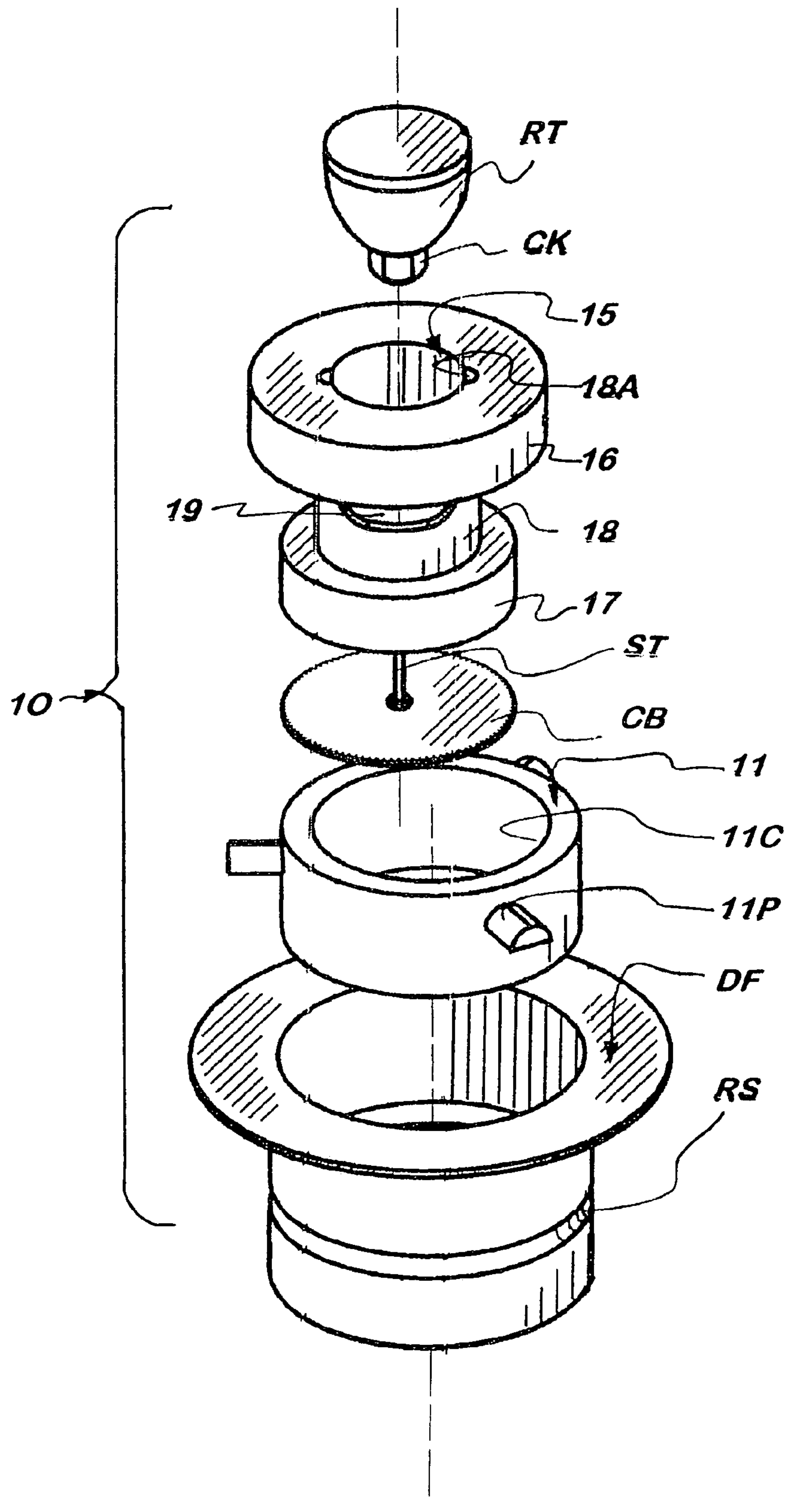
FIG. 2 is a further perspective illustration, separated by parts, of the inventive sink drain fitting cutter guide depicting in separated form the several interlocking components thereof.
Figure 4:
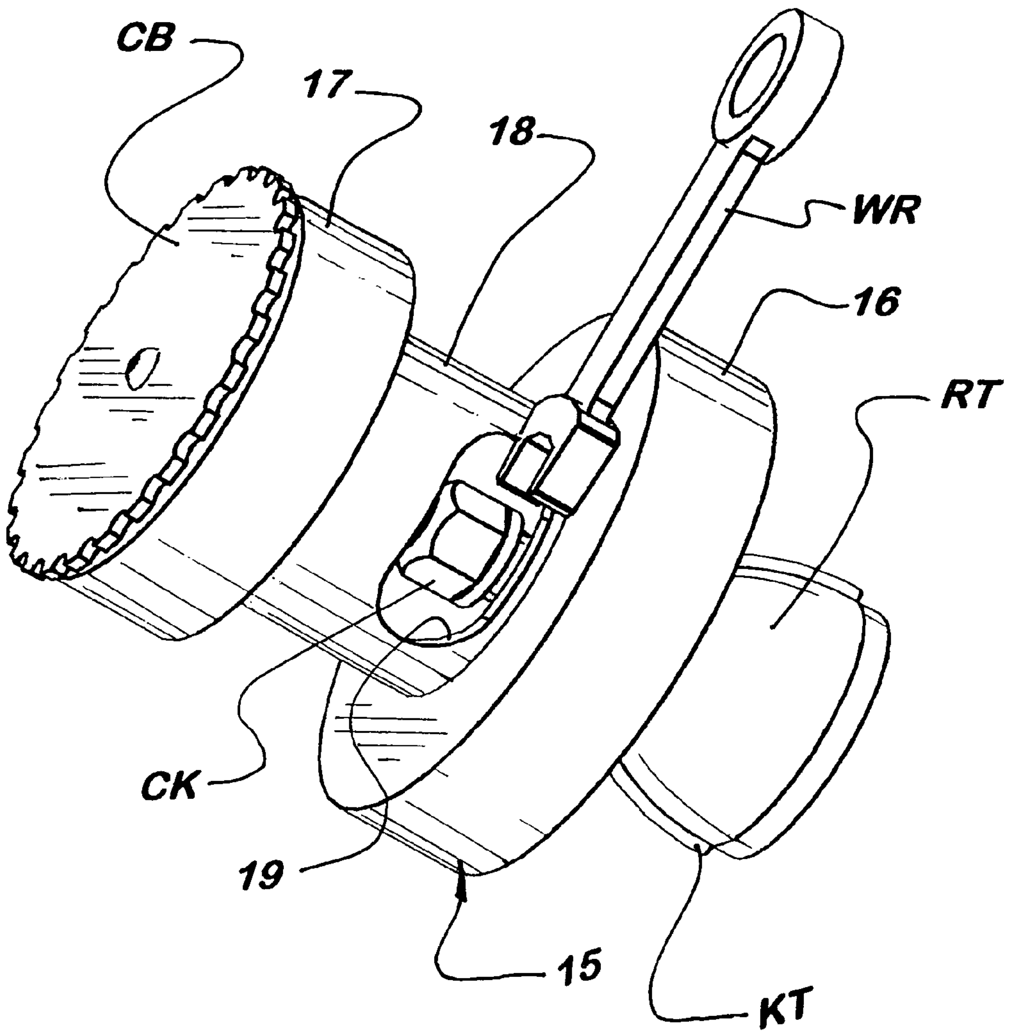
FIG. 4 is a detail view of one portion of the inventive cutter guide illustrating the blade mounting access and the indices for the deployment reach thereof obtained by virtue of the inventive geometric aspects of the present invention.

Most often this cutting process is carried out by a powered hand tool HT in which an axially received rotary blade RB is used to cut through the drain fitting DF. Of course, an unrestrained deployment of a powered tool into the fitting interior can produce all sorts of unwanted damage and to insure a cut that is limited both in its depth and axial location coincident with the ring seat RS I have devised the instant cutter guide assembly set out below by particular reference to FIGS. 2-4 wherein the interlocked guide assembly, generally designated by the numeral 10, includes a cylindrical segment or collar 11 defined by an upper surface 11U and a generally parallel lower surface 11L and radially dimensioned for conforming receipt in the annular cavity of the drain fitting DF. To limit the depth of insertion in the fitting DF the collar 11 is provided with a plurality of radially extending posts 11P at the upper periphery thereof which support the collar on the drain fitting flange in partial therein to serve as a guide platform for the cutting process.

A second, interior cylindrical segment 15 defined by an upper peripheral ring 16 and a lower peripheral ring 17 forming radially projecting bands at the ends of a central tubular segment 18, the radial projection of the upper ring being greater than the central opening 11C in collar 11 while the lower peripheral ring 17 is conformed to pass through it, with the axial spacing between rings 16 and 17 being generally equal or just greater than the axial dimension of collar 11. In this form segment 15 can be suspended on collar 11 by the greater interfering radial span of ring 16 with the dimensional overlap then allowing the lower ring 17 to be laterally translated below the collar within the range of the dimensional gap between the exterior of tube segment 18 and collar opening 11C.

This dimensionally restricted movement of the interlocking parts relative each other can then be used to advantage to guide a conventional rotary power tool RT axially seated in a conformingly shaped central cavity 18A in the upper end of interior segment 15 with its rotary head or chuck CK deployed within segment 18 where it is clamped onto the shaft ST that at its free end carries a circular cutting blade CB mounted to just extend beyond and clear the lower ring 17. Once so mounted any keying projections KT on tool RT may engage conforming deformation CD in cavity 18A to oppose the generated rotary forces while the contact between the lateral surface of ring 17 and the interior surface of the drain fitting DF limits the radial displacement of the tool, the depth of the resulting cut is positively determined by the difference between the blade and ring radii. Thus a relatively safe dimensionally limited mechanism is provided.

Those skilled in the art will appreciate that on occasion the cutting blade CB may need to be replaced, either because of wear or because of failure. To facilitate this replacement a tool opening 19 is provided in the lateral surface of tubular segment 18 through a wrench WR can be inserted to loosen or tighten chuck CK. It is to be noted that any blade replacement thus obtained will need to pass through the central opening 11C in collar 11, thereby limiting the maximum blade diameter while the manipulative need to grasp a blade edge exposed beyond the ring 17 while locking the chuck CK limits its minimum diameter, thereby resulting in a virtually fool-proof device in which the size of the replaced blade is limited to a range of diameters set by ring 17 and opening 11C.

Those in the art will further appreciate that principal mode of operation of this interlocking arrangement relies on contacts between large surfaces which limits any incidence of high local loading and convenient polymeric material structures like polyvinyl chloride [PVC] or more preferably acrynolite butadiene styrene [ABS] are wholly suitable for the fabrication thereof. As result an easily produced, save and easily used assembly is provided which may be included as an installation aid for those purchasing replacement garbage disposals.

Obviously many modifications and variations of the instant invention can be effected without departing from the spirit of the teachings herein. It is therefore intended that the scope of the invention be determined solely by the claims appended hereto.

I claim:

1. A cutting guide useful in positioning and guiding a rotary blade operatively engaged in a chuck of a rotary cutting tool in an alignment proximate a ring retaining groove of a sink drain fitting comprising, in combination:

a circular collar conformed for a mating fit within an interior of said fitting including a plurality of radial projections extending from an upper periphery thereof for the support of said collar in partial receipt within said fitting, said collar including a central opening therein;

a tubular segment defined by an exterior radial dimension smaller than said central opening in said collar and including an upper peripheral ring on an upper portion of an exterior thereof of a dimension greater than the central opening within said collar and a lower peripheral ring on a lower peripheral portion thereof of a dimension smaller than said central opening in said collar, said upper and lower rings being axially separated from each other by a gap equal or greater than an axial dimension of said collar to accommodate a radial translation of said tubular segment within said central opening limited by the difference between the radial dimensions of said central opening of said collar and said exterior dimension of said tubular segment, said tubular segment including a lateral opening communicating from the exterior into an annular cavity between said upper and lower rings; and said annular cavity formed in said tubular segment conformed to receive in coaxial alignment said cutting tool and said chuck.

2. A cutting guide according to claim 1, wherein:

said rotary blade includes a central shaft orthogonally extending from the center thereof.

3. A cutting guide according to claim 2, wherein:

said rotary blade is of a circular planform having a radial dimension greater than the radial dimension of said lower ring and lesser than the radial dimension of said central opening.

4. A cutting guide useful in positioning and guiding a circular blade operatively engaged in an axially aligned chuck at the end of a rotary cutting tool into an alignment proximate a ring retaining groove of a sink drain fitting comprising, in combination:

a circular collar defined by an upper and a substantially parallel lower surface and conformed for a mating fit within an interior of said fitting including a plurality of radial projections extending from a periphery thereof proximate said upper surface for supporting said collar in partial receipt within said fitting, said collar including a generally coaxial central circular opening therein;

a tubular segment defined defined by an exterior radial dimension smaller than said central opening in said collar and by an upper peripheral ring on an upper portion of an exterior thereof of a radial dimension greater than central opening within said collar and a lower peripheral ring on a lower peripheral portion thereof of a radial dimension smaller than said central opening in said collar, said upper and lower rings being axially separated from each other by a gap equal or greater than an axial dimension of said collar between said upper and lower surfaces thereof for accommodating a radial translation of said tubular segment within said central opening limited by the difference between the respective radial dimensions of said central opening of said collar and said exterior dimension of said tubular segment, said tubular segment including a lateral opening communicating from an exterior into said annular cavity between said upper and lower rings for providing manipulative access to said chuck; and said annular cavity formed in said tubular segment conformed to receive in coaxial alignment a portion of said cutting tool including said chuck.

5. A cutting guide according to claim 4, wherein:

said rotary blade includes a central shaft orthogonally extending from the center thereof conformed for receipt in said chuck.

6. A cutting guide according to claim 5, wherein:

said rotary blade is of a circular planform having a radial dimension greater than the radial dimension of said lower ring and lesser than the radial dimension of said central opening.

7. A cutting guide according to claim 4, wherein:

said collar and said tubular segment each comprise polymeric material structures.

* * * * *